Aug. 14, 1945.  F. E. MEDCOFF  2,382,896
BARKING MACHINE
Filed Nov. 2, 1944  3 Sheets-Sheet 2
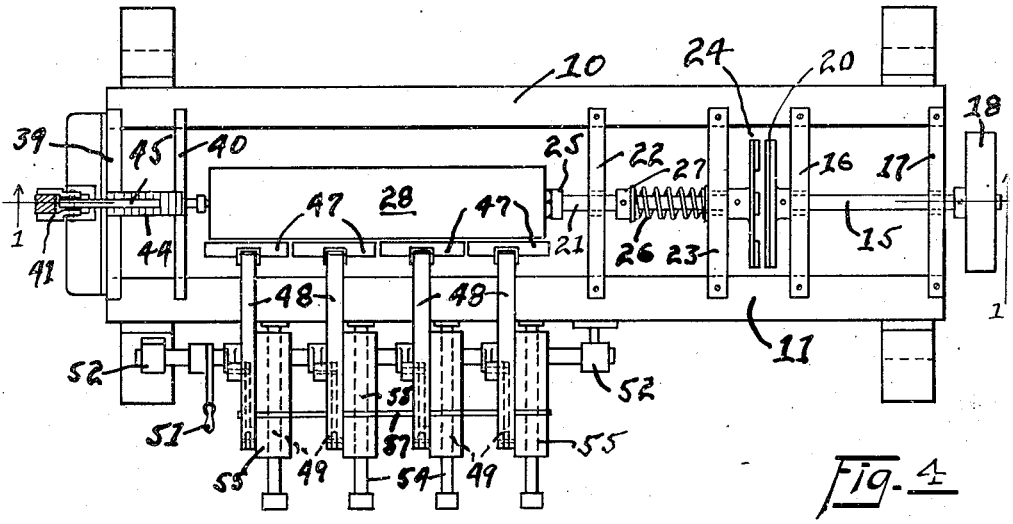
Fig. 4
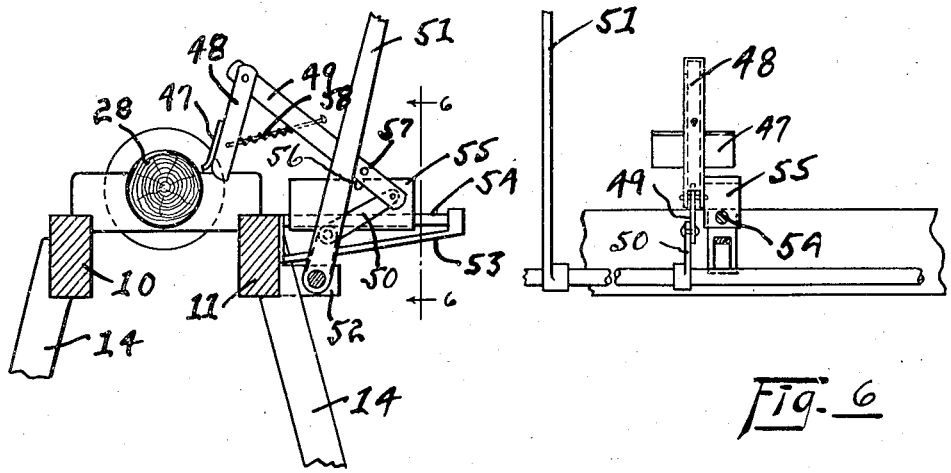
Fig. 5
Fig. 6
Witness:
Geo. L. Chapel
Inventor
Franklin E. Medcoff
By Rice and Rice
Attorneys Aug. 14, 1945.   F. E. MEDCOFF   2,382,896
BARKING MACHINE
Filed Nov. 2, 1944   3 Sheets-Sheet 3
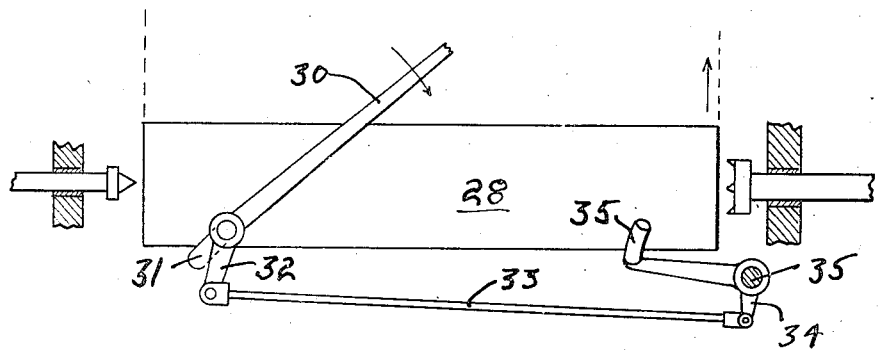
Fig. 7
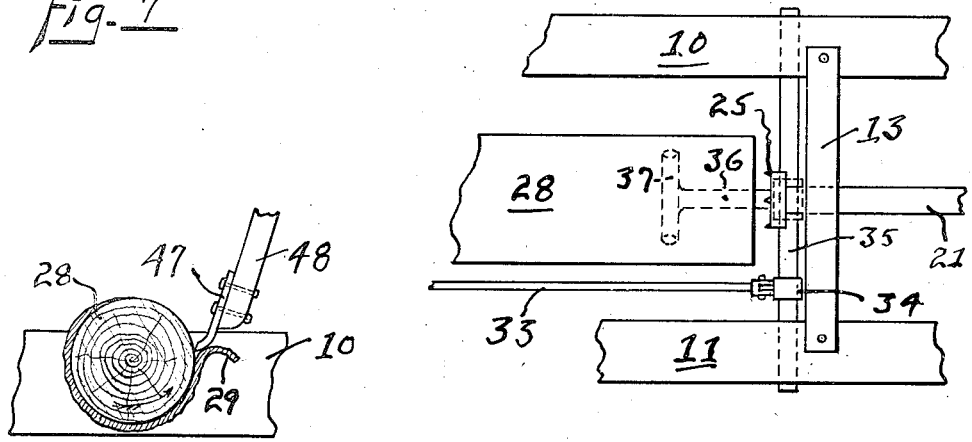
Fig. 9
Fig. 8
Witness:
Geo L. Shefel
Inventor
Franklin E. Medcoff
By Rice and Rice
Attorneys Patented Aug. 14, 1945

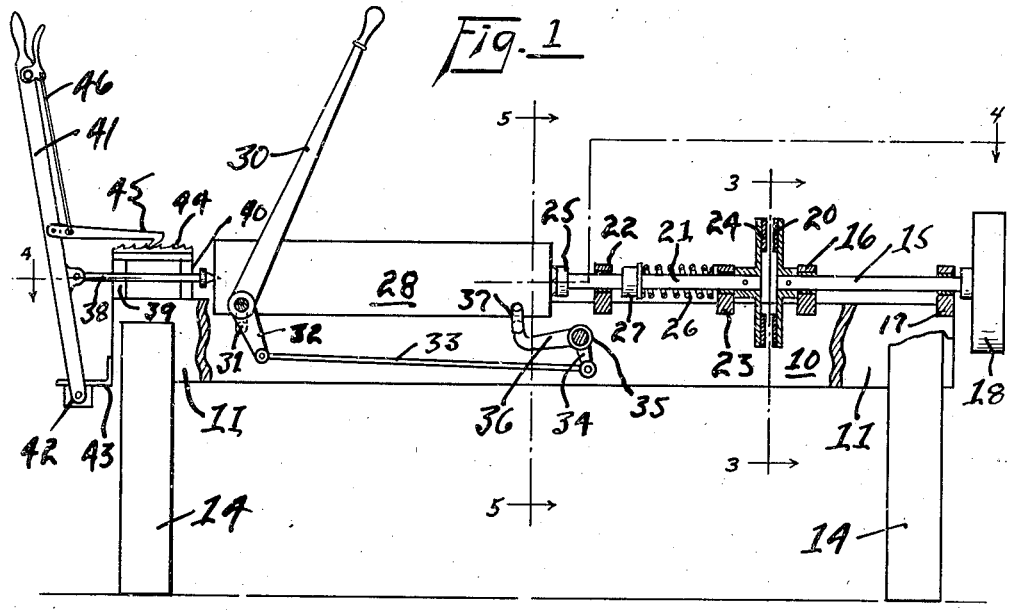
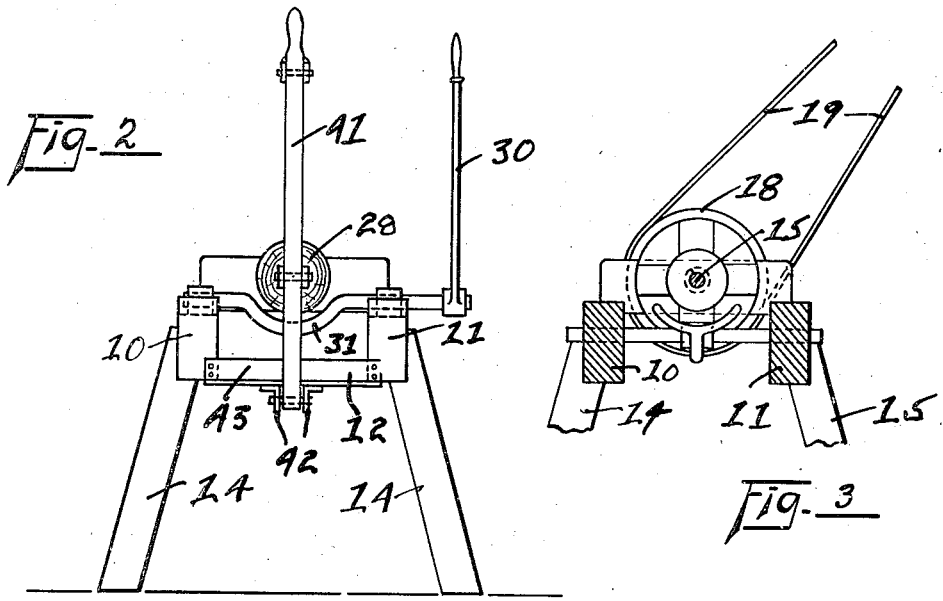

2,382,896

UNITED STATES PATENT OFFICE 2,382,896

BARKING MACHINE

Franklin E. Medcoff, Grand Rapids, Mich.

Application November 2, 1944, Serial No. 561,536

1 Claim. (Cl. 144—208)

The present invention relates to barking machines and more particularly to log scaling machines.

The primary objects of the instant invention are to provide a machine of the general character above indicated which is highly efficient in its intended use; to provide such a machine which is simple in construction; and, to provide such a machine which is reasonably economical in manufacture.

An illustrative embodiment of the invention is shown in the accompanying drawings, wherein:

Figure 1 is a side elevational view, partly in longitudinal section on line 1—1 of Figure 4;

Figure 2 is an end elevational view thereof;

Figure 3 is a sectional view on line 3—3 of Figure 1;

Figure 4 is a view on line 4—4 of Figure 1;

Figure 5 is a sectional view on line 5—5 of Figure 1;

Figure 6 is a sectional view on line 6—6 of Figure 5;

Figure 7 is an enlarged fragmentary side elevational view;

Figure 8 is an enlarged fragmentary top plan view; and

Figure 9 is an enlarged fragmentary end elevational view.

Referring then to the drawings wherein like parts of the machine are designated by the same numerals in the several views, the barking device comprises a pair of spaced elevated longitudinally disposed frame members 10, 11 secured together adjacent their opposite ends by cross ties 12, 13 and supported in elevated position at their respective opposite ends by a pair of opposite angularly disposed legs 14.

A longitudinally disposed shaft 15 rotatable within spaced transverse bearings 16, 17 supported by frame members 10, 11 is provided at its outer end with a pulley wheel 18 driven by a belt 19 and is provided at its inner end with a transverse friction clutch disc 20.

A second longitudinal shaft 21 axially disposed with respect to the shaft 15 and rotatable within spaced transverse bearings 22, 23 is provided at one end with a transverse friction clutch disc 24 and at its other end with a log receiving chuck 25 and a helical contraction spring 26 circumscribing the shaft 21 is secured at one end to the friction clutch disc 24 and at its other end to a collar 27 secured to said shaft 21.

A lift and centering mechanism for the log 28 to be scaled of its bark 29 comprises a vertically disposed lever 30 provided with a cradle 31 transversely pivotally mounted between the frame members 10, 11 and having a fixed arm 32 pivotally secured to a link 33 whose other end is pivotally secured to an arm 34 fixed to a shaft 35 rotatable between the frame members 10, 11 and a transverse arm 36 is provided at its free end with a cradle 37.

A spindle 38 whose free end or head is adapted to engage the outer end of the log 28 after the lift and centering mechanism has been manually operated by the lever 30 is axially disposed with respect to the log between spaced bearing members 39, 40 mounted on the frame members 10, 11 and is pivotally secured at its other end to a lever 41 whose lower end is pivotally secured to a bracket 42 fixed to an arm 43 fixed between the frame members 10, 11. Operating of the lever 41 in a clockwise direction, will move the spindle 38 to clamp the log 28 between said head and the chuck 25 and move the chuck shaft 21 toward the rotatable shaft 15 to thereby force the clutch discs 20 and 24 into engagement with each other for rotating the log.

Disposed above and fixed between the spaced bearing members 39, 40 is a longitudinally disposed rack 44 and a ratchet toothed arm 45 is adapted to engage any of the several teeth of the rack 44 as best shown in Figure 1 is pivotally connected to the lever 41.

A lever handle 46 pivotally secured adjacent its upper end to the lever 41 is pivotally secured to the toothed arm 45 for disengaging the tooth from any of the several teeth of the rack 44.

Means for barking or scaling the log 28 is here shown as a plurality of curved parallel upwardly angularly disposed knives or blades 47, each fixedly secured to one end of a link 48, whose other end is pivotally secured to a link 49. The link 49 is pivotally secured to a link 50 whose other end is pivotally secured to a lever 51 pivotally mounted upon brackets 52 secured to the member 11.

A plurality of spaced brackets 53 secured to the member 11 at their inner ends each support a spaced apart rod 54 on each of which is a longitudinally slidable block 55.

Each block 55 is provided with a parallel registering groove 56 on its upper side and the link 49 is provided with a laterally disposed rod 57 adapted to be seated within the parallel registering grooves 56 of each block 55 and against the tension of the helical expansion spring 58 between the links 48, 49 when the lever 51 is swung to the left as viewed in Figure 5 whereby the knives 47 are caused to bark or scale the log 28.

It will thus be seen that the barking or log scaling machine is efficient in its intended use, is simple in construction and is reasonably economical in manufacture and while but one specific embodiment of the invention has been shown and described, it will be understood that certain details of the construction shown may be altered or omitted without departing from the spirit of the invention as the same is defined by the following claim.

I claim:

A machine of the class described comprising a movable head and a spaced axially disposed movable chuck having a clutching opposite end portion, means for axially centering a generally cylindrical member between the head and chuck, rotatably movable means in axial alignment with the chuck and head having a clutching end portion adapted to be engaged by said other clutching end portion upon movement of said chuck toward said rotatably movable means, means for moving said head toward said chuck to clamp a generally cylindrical member therebetween and for moving said chuck toward said rotatably movable means for effecting clutching engagement of said clutching end portions, and a knife adapted to be moved into engagement with the peripheral surface of said cylindrical member for scaling the same during the rotation thereof.

FRANKLIN E. MEDCOFF.